United States Patent
Kindred et al.

(10) Patent No.: US 10,674,465 B2
(45) Date of Patent: *Jun. 2, 2020

(54) METHOD AND APPARATUS FOR SYNCHRONIZING HEARING INSTRUMENTS VIA WIRELESS COMMUNICATION

(71) Applicant: Starkey Laboratories, Inc., Eden Prairie, MN (US)

(72) Inventors: Jon S. Kindred, Minneapolis, MN (US); Tao Zhang, Eden Prairie, MN (US); Ivo Merks, Eden Prairie, MN (US); Jeffrey Paul Solum, Greenwood, MN (US); Mihran H Touriguian, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,449

(22) Filed: Oct. 29, 2018

(65) Prior Publication Data

US 2019/0132812 A1    May 2, 2019

Related U.S. Application Data

(63) Continuation of application No. 15/295,222, filed on Oct. 17, 2016, now Pat. No. 10,117,203, which is a
(Continued)

(51) Int. Cl.
*H04W 56/00* (2009.01)
*G06F 1/12* (2006.01)
(Continued)

(52) U.S. Cl.
CPC .......... *H04W 56/0015* (2013.01); *G06F 1/12* (2013.01); *H04J 3/0664* (2013.01); *H04J 3/0697* (2013.01);
(Continued)

(58) Field of Classification Search
CPC ......... G06F 1/12; H04J 3/0664; H04J 3/0697; H04R 2225/55; H04R 25/405;
(Continued)

(56) References Cited

U.S. PATENT DOCUMENTS 6,768,802 B1   7/2004  Baechler
7,169,996 B2   1/2007  Georges et al.
(Continued)

FOREIGN PATENT DOCUMENTS

DE    102005036851 B3    11/2006

OTHER PUBLICATIONS

"U.S. Appl. No. 13/683,986, Advisory Action dated Mar. 2, 2016", 2 pgs.
(Continued)

*Primary Examiner* — Terrell S Johnson
(74) *Attorney, Agent, or Firm* — Schwegman Lundberg & Woessner, P.A.

(57) ABSTRACT

A hearing assistance system including a hearing instrument designated as a master device and at least another hearing instrument designated as a slave device. The master device is communicatively coupled to the slave device via a wireless link. The master device has a master clock and generates master time stamps for specified events timed by the master clock. The master time stamps are sent to the slave device via the wireless link. The slave device has a slave clock and generates slave time stamps for specified events timed by the slave clock. The slave clock is adjusted for synchronization to the master clock using the master time stamps and the slave time stamps.

20 Claims, 5 Drawing Sheets

Related U.S. Application Data continuation of application No. 13/683,986, filed on Nov. 21, 2012, now Pat. No. 9,471,090.

(51) Int. Cl.

| | | |
|---|---|---|
| *H04R 25/00* | (2006.01) | |
| *H04J 3/06* | (2006.01) | |
| *H04W 84/20* | (2009.01) | |

(52) U.S. Cl.
CPC ......... *H04R 25/552* (2013.01); *H04R 25/554* (2013.01); *H04W 56/005* (2013.01); *H04R 25/405* (2013.01); *H04R 2225/55* (2013.01); *H04W 84/20* (2013.01)

(58) Field of Classification Search
CPC ............... H04R 25/552; H04R 25/554; H04W 56/0015; H04W 56/005; H04W 84/20; G08C 17/02; G08C 2201/91; G08C 23/04
See application file for complete search history.

(56) References Cited

U.S. PATENT DOCUMENTS

| | | |
|---|---|---|
| 7,778,432 B2 | 8/2010 | Larsen |
| 8,059,825 B2 | 11/2011 | Latzel |
| 9,471,090 B2 | 10/2016 | Kindred et al. |
| 10,117,203 B2 | 10/2018 | Kindred |
| 2004/0037442 A1 | 2/2004 | Nielsen et al. |
| 2004/0208332 A1 | 10/2004 | Baechler |
| 2007/0030988 A1 | 2/2007 | Bauml et al. |
| 2009/0086764 A1 | 4/2009 | Lee et al. |
| 2010/0111338 A1 | 5/2010 | Ypma et al. |
| 2010/0254552 A1 | 10/2010 | Barthel et al. |
| 2011/0033071 A1 | 2/2011 | Larsen |
| 2011/0075685 A1 | 3/2011 | Xu et al. |
| 2011/0158264 A1 | 6/2011 | Philips et al. |
| 2014/0143582 A1 | 5/2014 | Kindred et al. |
| 2017/0099644 A1 | 4/2017 | Kindred et al. |

OTHER PUBLICATIONS

"U.S. Appl. No. 13/683,986, Final Office Action dated Oct. 22, 2015", 21 pgs.

"U.S. Appl. No. 13/683,986, Non Final Office Action dated Apr. 2, 2015", 17 pgs.

"U.S. Appl. No. 13/683,986, Notice of Allowance dated Jun. 16, 2016", 13 pgs.

"U.S. Appl. No. 13/683,986, Response filed Jan. 22, 2016 to Final Office Action dated Oct. 22, 2015", 12 pgs.

"U.S. Appl. No. 13/683,986, Response filed Jul. 1, 2015 to Non Final Office Action dated Apr. 2, 2015", 10 pgs.

"U.S. Appl. No. 15/295,222, Non Final Office Action dated Mar. 9, 2018", 8 pgs.

"U.S. Appl. No. 15/295,222, Notice of Allowance dated Jun. 28, 2018", 5 pgs.

"U.S. Appl. No. 15/295,222, Response Filed Jun. 1, 2018 to Non Final Office Action dated Mar. 9, 2018", 8 pgs.

"European Application Serial No. 13193807.8, Communication Pursuant to Article 94(3) EPC dated Nov. 28, 2017", 6 pgs.

"European Application Serial No. 13193807.8, Extended European Search Report dated Aug. 4, 2015", 8 pgs.

"European Application Serial No. 13193807.8, Response filed Apr. 6, 2018 to Communication Pursuant to Article 94(3) EPC dated Nov. 28, 2017", 28 pgs.

"IEEE Standard for a Precision Clock Synchronization Protocol for Networked Measurement and Control Systems", IEEE Instrumentation and Measurement Society. IEEE Std 1588-2008, (Jul. 24, 2008), 289 pgs.

"Serial No. 13193807.8, Response filed Apr. 24, 2017 to European Office Action dated Dec. 16, 2016", 28 pgs.

"European Application Serial No. 13193807.8, Communication Pursuant to Article 94(3) EPC dated Jul. 30, 2019", 5 pgs.

METHOD AND APPARATUS FOR SYNCHRONIZING HEARING INSTRUMENTS VIA WIRELESS COMMUNICATION

PRIORITY

This application is a continuation of U.S. patent application Ser. No. 15/295,222, filed Oct. 17, 2016, now issued as U.S. Pat. No. 10,117,203, which is a continuation of U.S. patent application Ser. No. 13/683,986, filed Nov. 21, 2012, now issued as U.S. Pat. No. 9,471,090, each of which are incorporated by reference herein in their entirety.

TECHNICAL FIELD

This document relates generally to hearing assistance systems and more particularly to a method and apparatus for synchronizing wirelessly coupled hearing instruments for simultaneous signal processing.

BACKGROUND

A pair of hearing instruments may be worn on each side of a person's head to deliver stereo sounds to the person's ears. An example of such hearing instruments includes a pair of hearing aids that are used to assist a patient suffering hearing loss by transmitting amplified sounds to ear canals. The hearing aids are each worn in and/or around one of the patient's ears. It is desirable to deliver sounds to both ears in a way that provide for perception of a realistic sound environment. For example, use of two microphones, one in each of the hearing aids, may allow for perception of sounds with directionality. This requires the sound sensing/receiving, amplification, and delivery into ear canals to be coordinated between the hearing instruments.

SUMMARY

A hearing assistance system including a hearing instrument designated as a master device and at least another hearing instrument designated as a slave device. The master device is communicatively coupled to the slave device via a wireless link. The master device has a master clock and generates master time stamps for specified events timed by the master clock the master time stamps are sent to the slave device via the wireless link. The slave device has a slave clock and generates slave time stamps for specified events timed by the slave clock. The slave clock is adjusted for synchronization to the master clock using the master time stamps and the slave time stamps.

In one embodiment, a hearing assistance system includes a first hearing instrument and a second hearing instrument. Either the first or the second hearing instruments may be designated as a master device during an initial synchronization phase, with the other hearing instrument being a slave device. For example, the first hearing instrument is designated as a master device and includes a master clock, a master synchronization circuit, and a master device radio circuit. The master synchronization circuit is configured to generate master time stamps for specified events using the master clock. The master device radio circuit is configured to transmit the master time stamps via a wireless link. The second hearing instrument is designated as a slave device and includes a slave device radio circuit, a slave clock, and a slave synchronization circuit. The slave device radio circuit is configured to receive the master time stamps via the wireless link. The slave synchronization circuit is configured to generate slave time stamps for specified events using the slave clock and adjust the slave clock for synchronization with the master clock using the master time stamps and the slave time stamps.

In one embodiment, a method for synchronizing a first hearing instrument with a second hearing instrument is provided. A synchronization cycle is initiated. Master time stamps are generated for specified events timed using a master clock in the first hearing instrument during the synchronization cycle. The master time stamps are sent to the second hearing instrument via a wireless link. Slave time stamps are generated for specified events timed using a slave clock in the second hearing instrument during the synchronization cycle. The slave clock is adjusted for synchronization of the slave clock to the master clock using the master time stamps and the slave time stamps.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
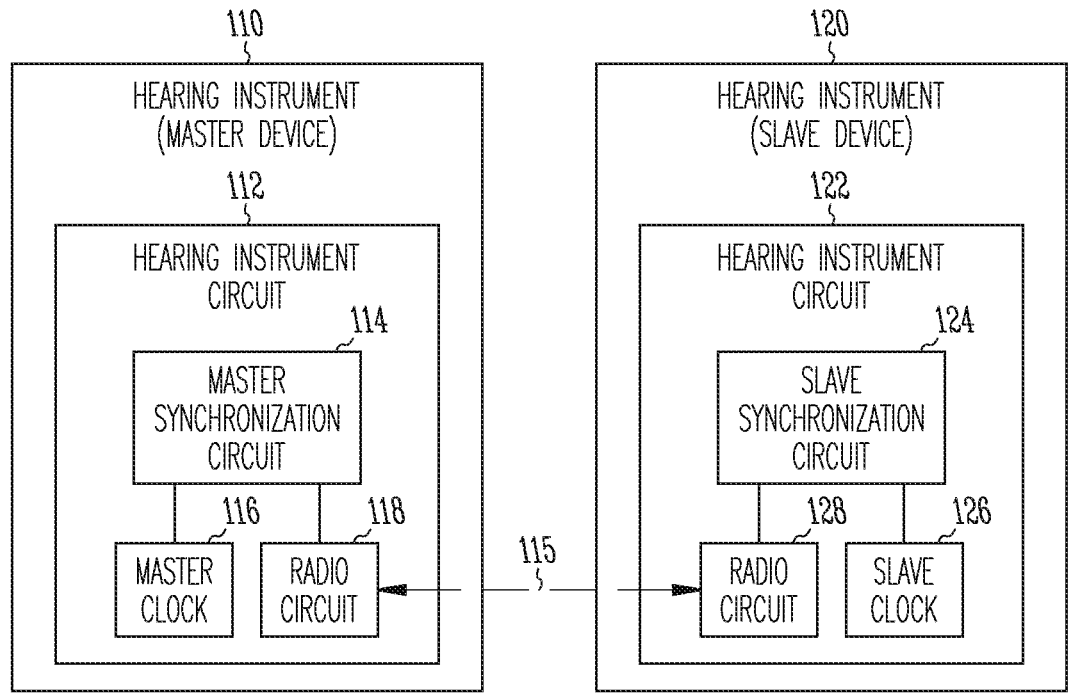
FIG. 1 is an illustration of an embodiment of a hearing assistance system including a pair of hearing instruments being a master device and a slave device.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses a system and method for synchronizing a plurality of hearing instruments. In various embodiments, a hearing assistance system includes hearing instruments, such as hearing aids, with synchronized clocks that allow for synchronous signal processing. Synchronous signal processing between two hearing instruments placed on each side of a person's head allows, for example, enhancement of directionality in sound perception and cancellation of unwanted sounds (noise or interference). Audio signals are transmitted between the two hearing instruments bidirectionally to exploit relationship between input signals received by the two microphones from both sides of the person's head. This requires establishment and maintenance of clock synchronization between the two hearing instruments, thereby allowing for synchronous processing of the input signals in both hearing instruments. The present system and method provide for such clock synchronization. In various embodiments, the present system and method allow for synchronous communication and signal processing between the two hearing instruments, such that two spacially diverse audio signals can be combined for use in phased array processing. The purposes include improvement of directionality of sound perceived by the person using the hearing instruments, such as a patient wearing a pair of hearing aids. In various embodiments, the present system and method use time stamps generated using two hearing instruments to acquire and maintain synchronization between the two hearing instruments. While other known methods of synchronization involve matching phase using direct sequence spread spectrum at the physical layer of the radio-frequency (RF) subsystem. The present system is independent of the physical layer of the RF subsystem and allows for multiple modulation types.

In various embodiments, the present system and method lock a wireless hearing instrument acting as a master device to another wireless hearing instrument acting as a slave device. The present system and method can also be extended to synchronize the wireless hearing instruments with their peripheral devices. In various embodiments, the wireless hearing instruments include hearing aids. A pair of hearing aids for use on each side of the patient's heads act as the master and slave devices. In various embodiments, the present system and method are implemented using software programmed into the hearing aids. In one embodiment, a synchronization cycle that allows for the wireless hearing instruments to be synchronized includes exchange of three messages between the master device and the slave device. In various embodiments, the present system and method time-stamp transmission and reception of specified events in the master and slave devices. Using these time stamps, a clock offset between the master and slave devices is calculated. The slave device tracks the clock offset and adjusts its clock for synchronization to the clock of the master device. In one embodiment, the clock tracking and adjustment is performed only in the slave device.

FIG. 1 is an illustration of an embodiment of a hearing assistance system 100 including a pair of hearing instruments 110 and 120. Hearing instrument 110 is designated as a master device, and hearing instrument 120 is designated as a slave device, for purposes of synchronizing the clocks and various operations of the two instruments. Hearing instruments 110 and 120 communicate with each other via a wireless link 115.

Hearing instrument 110 (the master device) has a circuit including a master synchronization circuit 114, a master clock 116, and a radio circuit 118. Master synchronization circuit 114 generates master time stamps for specified events timed using master clock 116. Radio circuit 118 transmits the master time stamps to hearing instrument 120 (the slave device) via wireless link 115.

Hearing instrument 120 (the slave device) has a circuit including a slave synchronization circuit 124, a slave clock 126, and a radio circuit 128. Radio circuit 128 receives the master time stamps transmitted from hearing instrument 110. Slave synchronization circuit 124 generates slave time stamps for specified events timed using the slave clock and adjusts slave clock 126 for synchronization with master clock 116 using the master time stamps and the slave time stamps. In this document, "the master time stamps" include time stamps that are generated in a master device using a master clock (clock/timer of the master device), and "the slave time stamps" include time stamps that are generated in a slave device using a slave clock (clock/timer of the slave device). In one embodiment, master clock 116 and slave clock 118 each include a counter with an adjustable clock frequency.

In various embodiments, the circuit of each of hearing instruments 110 and 120, including its various embodiments and elements discussed in this document, can be implemented using a combination of hardware and software (including firmware). In various embodiments, master synchronization circuit 114 and slave synchronization circuit 124, including its various embodiments and elements discussed in this document, may each be implemented using an application-specific circuit constructed to perform one or more functions related to the synchronization method as discussed in this document or a general-purpose circuit programmed to perform such one or more functions. Such a general-purpose circuit includes, but is not limited to, a microprocessor or a portion thereof, a microcontroller or portions thereof, and a programmable logic circuit or a portion thereof.

Figure 2:
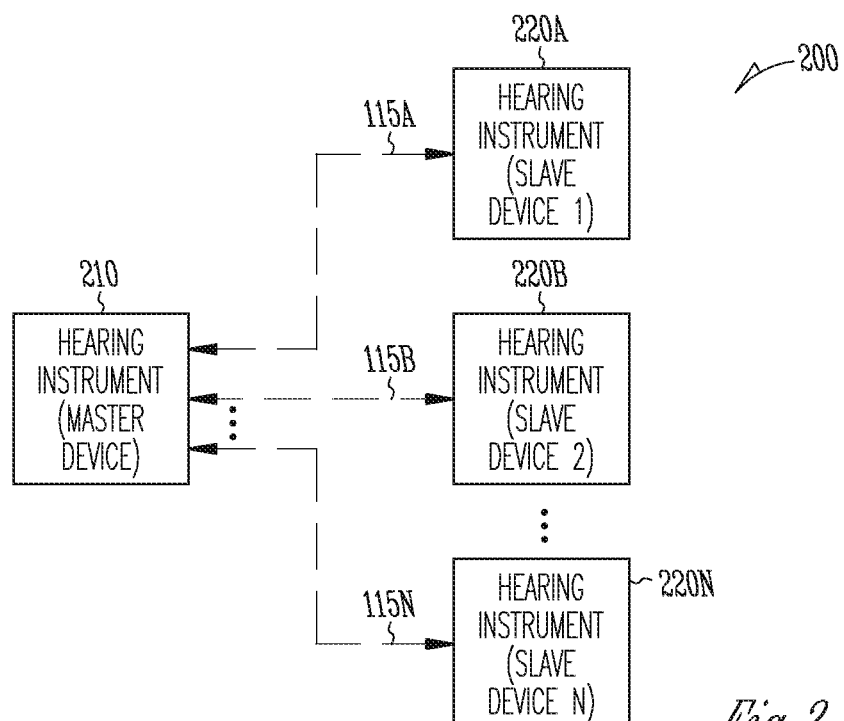
FIG. 2 is an illustration of an embodiment of a hearing assistance system including a master device and a plurality of slave devices.

FIG. 2 is an illustration of an embodiment of a hearing assistance system 200, which includes a plurality of hearing instruments 210 and 220A-N. Hearing instrument 210 represents an embodiment of hearing instrument 110 and is designated as the master device. Hearing instruments 220 each represent an embodiment of hearing instrument 120 and is designated as the slave device. Hearing instrument 210 (the master device) is capable of communicating with multiple hearing instruments 220A-N (the slave devices) via one of wireless links 115A-N. In various embodiments, hearing instrument 210 generates the master time stamps and sends the master time stamps to each of hearing instruments 220A-N via the corresponding link of wireless links 115A-N. Hearing instruments 220A-N each generate slave time stamps and adjust its slave clock for synchronization with the master clock using the master time stamps and the slave time stamps. Thus, all the hearing instruments in hearing assistance system 200 are synchronized as the slave clock in each of hearing instruments 220A-N is synchronized to the master clock in hearing instrument 210.

Figure 3:
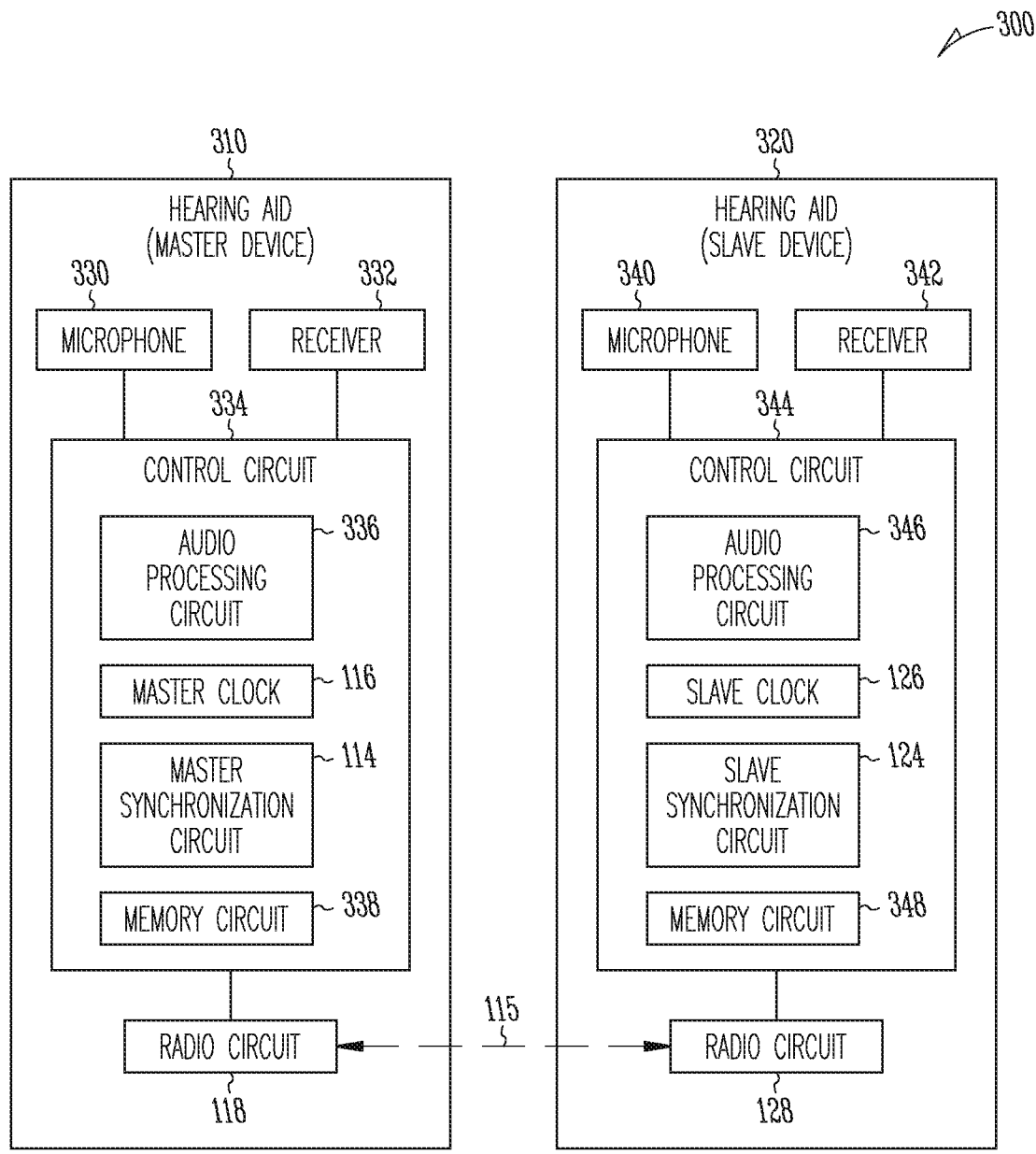
FIG. 3 is a block diagram illustrating an embodiment of a pair of hearing aids being a master device and a slave device.

FIG. 3 is a block diagram illustrating an embodiment of a hearing aid system 300 including a pair of hearing aids 310 and 320. Hearing aid system 300 represents an embodiment of hearing assistance system 100. Hearing aid 310 represents an embodiment of hearing instrument 110 and is the master device. Hearing aid 320 represents an embodiment of hearing instrument 120 and is the slave device. In various embodiments, hearing aids 310 and 320 are configured to be used for the left and right ears of a patient. Hearing aids 310 is the right hearing aid, and hearing aid 320 is the left hearing aid, or vice versa. The right hearing aid is configured to be placed in and/or about the right ear, and the left hearing aid is configured to be placed in and/or about the left ear.

Hearing aid 310 (the master device) has a hearing aid circuit including a microphone 330, a receiver (speaker) 332, radio circuit 118, and a control circuit 334 coupled to microphone 330, receiver 332, and radio circuit 118. Control circuit 334 includes an audio processing circuit 336, master clock 116, master synchronization circuit 114, and a memory circuit 338. In one embodiment, control circuit 334 is a microprocessor-based circuit including a processor configured to include audio processing circuit 336 and master synchronization circuit 114. Audio processing circuit 336 includes portions of the processor programmed to execute instructions for processing signals received by microphone 330 and/or radio circuit 118 to generate an audio signal to transmit to an ear canal of the patient using receiver 332 and/or generate data to be transmitted to hearing aid 320 using radio circuit 118. Master synchronization circuit 114 includes portions of the processor programmed to execute instructions for synchronizing the slave device to the master device, and is further discussed below with reference to FIGS. 4-6. Memory circuit 338 includes the instructions to be executed by the processor of control circuit 334.

Hearing aid 320 (the slave device) has a hearing aid circuit including a microphone 340, a receiver (speaker) 342, radio circuit 128, and a control circuit 344 coupled to microphone 340, receiver 342, and radio circuit 128. Control circuit 344 includes an audio processing circuit 346, slave clock 126, slave synchronization circuit 124, and a memory circuit 348. In one embodiment, control circuit 344 is a microprocessor-based circuit including a processor configured to include audio processing circuit 346 and slave synchronization circuit 124. Audio processing circuit 346 includes portions of the processor programmed to execute instructions for processing signals received by microphone 340 and/or radio circuit 128 to generate an audio signal to transmit to the other ear canal of the patient using receiver 342 and/or generate data to be transmitted to hearing aid 310 using radio circuit 128. Slave synchronization circuit 124 includes portions of the processor programmed to execute instructions for synchronizing the slave device to the master device, and is further discussed below with reference to FIGS. 4-6. The synchronization includes synchronizing slave clock 126 to master clock 116. Memory circuit 348 includes the instructions to be executed by the processor of control circuit 344.

In various embodiments, signals from microphones 330 and 340 are combined such that microphones 330 and 340 function as a microphone array, and the synchronization allows for signal processing for enhancement of directionality, beam steering, and/or null steering to reduce an unwanted audio source. Audio processing circuits 336 and 346 are configured to combine signals received by microphones 330 and 340 to produce the audio signals for transmission to the ear canals with the enhanced directionality and/or reduced noise such as sound from the unwanted audio source. In one example, the signals received by microphone 330 and/or radio circuit 118 include signals received by microphones 330 and 340. Audio processing circuit 336 is programmed to enhance directionality of, and/or reduce noise in, the audio signal transmitted using receiver 332 by combining the signals received microphones 330 and 340. The signals received by microphone 340 and/or radio circuit 128 also include signals received by microphones 330 and 340. Audio processing circuit 346 is programmed to enhance directionality of, and/or reduce noise in, the audio signal transmitted using receiver 342 by combining the signals received microphones 330 and 340. An example of the noise in the audio signals includes sound from an unwanted audio source.

Figure 4:
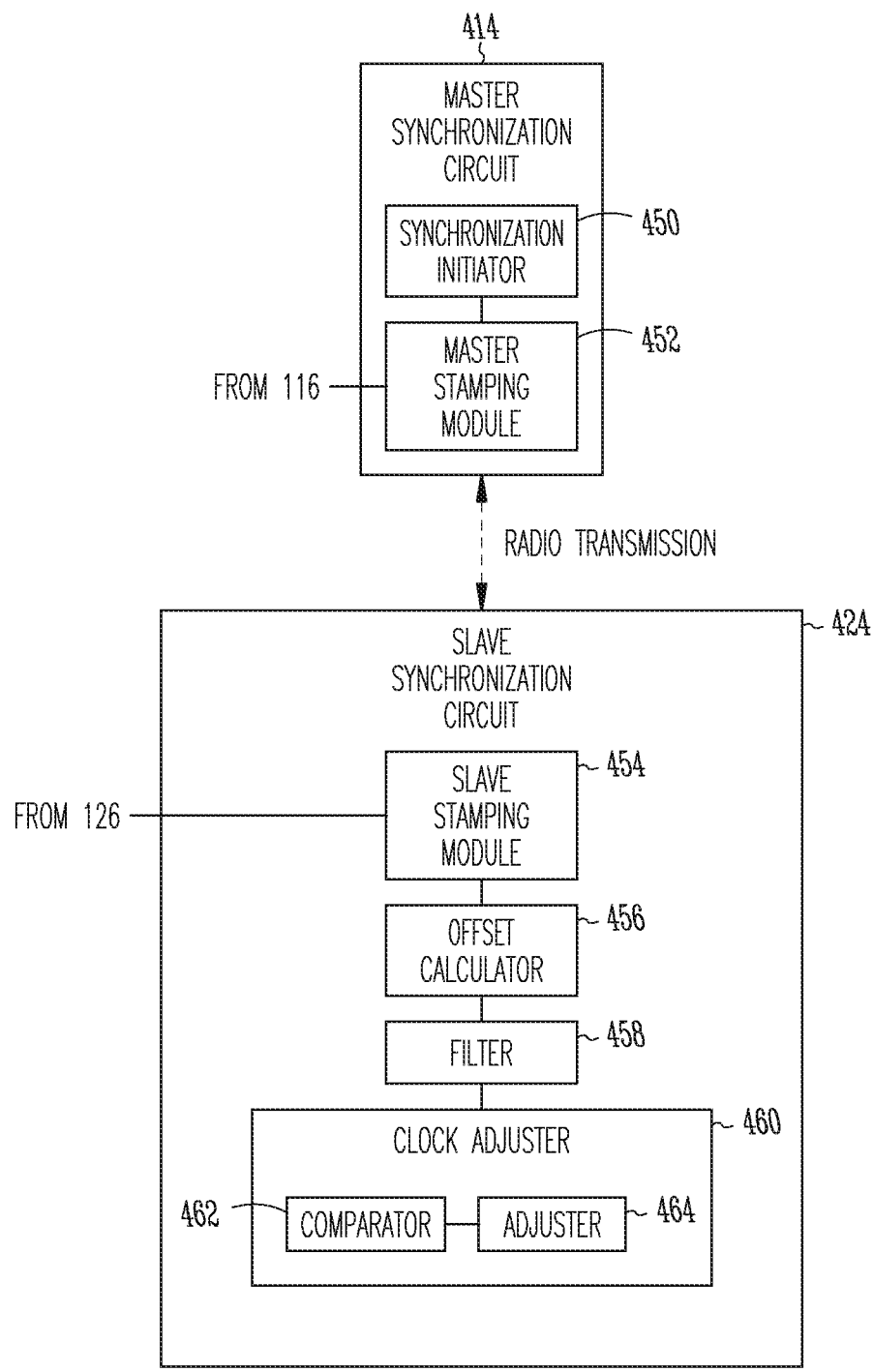
FIG. 4 is an illustration of an embodiment of a system providing for clock synchronization between a master device and a slave device.

FIG. 4 is an illustration of an embodiment of a system providing for clock synchronization between a master device and a slave device. The system includes a master synchronization circuit 414 being part of the master device and a slave synchronization circuit 424 being part of the slave device. Master synchronization circuit 414 and synchronization circuit 424 communicate with each other using telemetry, such as via wireless link 115.

Master synchronization circuit 414 represents an embodiment of master synchronization circuit 114. In the illustrated embodiment, the master device initiates synchronization cycles during which master clock 116 of the master device and slave clock 126 of the slave device are synchronized. Master synchronization circuit 414 includes a master stamping module 452 and a synchronization initiator 450. Master stamping module 452 generates the master time stamps for specified events timed using master clock 116. Synchronization initiator 450 initiates each of the synchronization cycles. In other embodiments, the slave device initiates synchronization cycles and includes synchronization initiator 450. In various embodiments, the synchronization cycles are initiated according to a specified schedule, such as periodically, or upon occurrences of specified events.

Slave synchronization circuit 424 represents an embodiment of slave synchronization circuit 124. In the illustrated embodiment, slave synchronization circuit 424 includes a slave stamping module 454, an offset calculator 456, a filter 458, and a clock adjuster 460. Slave stamping module 454 generates the slave time stamps for specified events timed using slave clock 126. Offset calculator 456 calculates one or more offset parameters indicative of offset between master clock 116 and slave clock 126 using the master time stamps and the slave time stamps. Filter 458 includes a low-pass filter to filter one or more offset parameters for which a need for filtering is identified. In various embodiments, if such a need is not identified for any of the one or more offset parameters, slave synchronization circuit 424 does not include filter 458. Clock adjuster 460 adjusts slave clock 126 for synchronizing slave clock 126 to master clock 116 using the one or more offset parameters. In the illustrated embodiment, clock adjuster 460 includes a comparator 462 and an adjuster 464. Comparator 462 compares the one or more offset parameters each to a specified offset threshold. Adjuster 464 adjusts slave clock 126 in response to at least one of the one or more offset parameters exceeding the corresponding specified offset threshold.

In one embodiment, the one or more offset parameters include a frequency offset and a phase offset. Clock adjuster 460 adjusts slave clock 126 for synchronizing slave clock 126 to master clock 116 using the frequency offset and the phase offset. In one embodiment, only the frequency offset is low-pass filtered by filter 458. Comparator 462 compares the frequency offset to a specified frequency offset threshold and compares the phase offset to a specified phase offset threshold. Adjustor 464 adjusts the frequency of slave clock 126 in response to the frequency offset exceeding the specified frequency offset threshold. This may be performed, for example, by trimming a crystal of slave clock 126. In another example, a phase-locked loop (PLL) is adjusted, or a frequency synthesized reference is adjusted. Adjustor 464 also adjusts the phase of slave clock 126 in response to the phase offset exceeding the specified phase offset threshold. In one embodiment, adjustment of the frequency of slave clock 126 is given higher priority over adjustment of the phase of slave clock 126. Clock adjuster 460 adjusts the frequency of slave clock 126 and subsequently the phase of slave clock 126 in response to both of the frequency offset and the phase offset exceeding their corresponding specified thresholds.

In various embodiments, the specified events to be time-stamped by master stamping module 452 and slave stamping module 454 include events timed by master clock 116 and slave clock 126 that allow for calculation of the one or more offset parameters, such as the frequency offset and phase offset. Examples of these specified events include interrupts or events associated with the interrupts. In one embodiment, the specified events include software interrupts or events associated with the software interrupts. In one embodiment, which is discussed below with reference to FIGS. 5 and 6, the specified events include transmission and reception of the interrupts in the master device and the slave device. Specific examples of such specified events include a packet transmit interrupt in the master device, a sync arrival interrupt indicating arrival of the packet at the slave device, the packet transmit interrupt in the slave device, and the sync arrival interrupt received in the master device.

Figure 5:
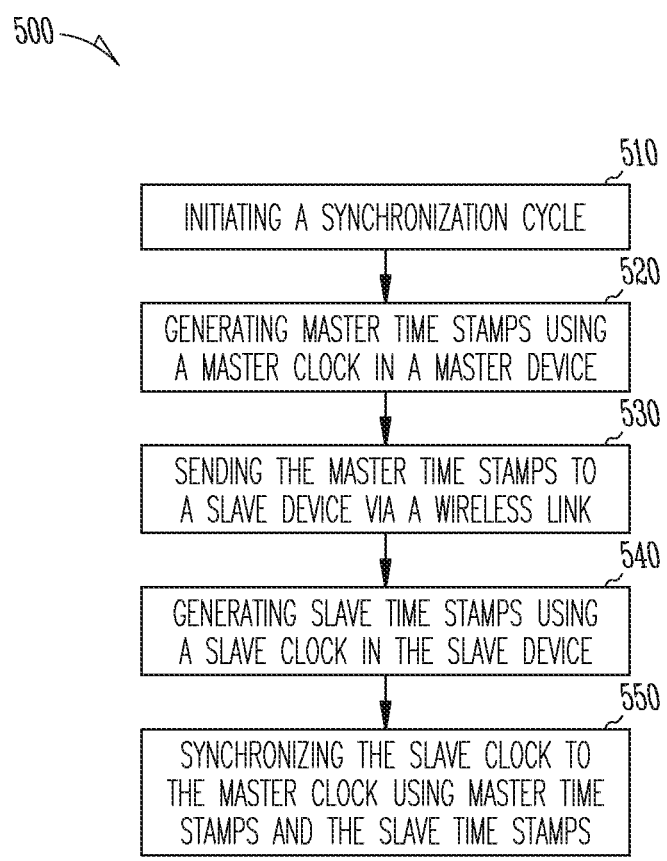
FIG. 5 is a flow chart illustrating an embodiment of a method for the clock synchronization between a master device and a slave device.

FIG. 5 is a flow chart illustrating an embodiment of a method 500 for the clock synchronization between a master device and a slave device. The master device and the slave device communicate with each other through a wireless link. Examples of the master device include hearing instruments 110 and 210 and hearing aid 310. Examples of the slave device include hearing instruments 120 and 220A-N and hearing aid 210. In one embodiment, method 500 is performed by master synchronization circuit 414 and slave synchronization circuit 424.

At 510, a synchronization cycle is initiated. To measure the clock offset between a master clock of the master device and a slave clock of the slave device, specified events that occur in both the master device and the slave device are time-stamped. In one embodiment, the master device initiates the synchronization cycle, during which all the time stamps required for one adjustment of the slave clock are collected, and that one adjustment is made for synchronizing the slave clock to the master clock.

At 520, master time stamps are generated in the master device using the master clock. At 530, the master time stamps are sent to the slave device via the wireless link. At 540, slave time stamps are generated in the salve device using the slave clock. Steps 520, 530, and 540 repeat as necessary during the synchronization cycle, until all the time stamps required for the one adjustment of the slave clock are obtained by the slave device, which tracks the time of the master clock and synchronizes itself to the master clock.

In one embodiment, an event specified to be time-stamped for purposes of the clock synchronization is a packet transmit interrupt event in each of the master device and the slave device. This event is time-stamped by saving the times of its transmission and reception as timed by the master clock and the slave clock, respectively. As the slave devices performs the time tracking, the master device sends the master time stamps to the slave device in the next possible packet header. The slave device does not need to send the slave time stamps to the master device. On the receiving side of each of the master device and the slave device, a sync arrival interrupt from the RF module indicates the arrival of the packet that was time-stamped on the transmitting side. The times of this reception of the sync arrival interrupt in the slave device and the master device as timed by the slave clock and the master clock, respectively, are saved as time stamps. The master device sends this master time stamp to the slave device in the next possible packet header. At this point, the slave device has collected four time stamps (two master time stamps and two slave time stamps) from which it can extract frequency and phase offsets.

At least three messages are required to be sent from the master device to the slave device during the synchronization cycle. The first message is the initiation of the synchronization cycle. This message may indicate two modes: an acquisition mode for an initial clock synchronization and a normal mode for maintaining the clock synchronization once initiated. In the acquisition mode, either a reset of both the master clock and the slave clock is performed, or the master device sends its clock time to the slave device for the slave device to initialize the slave clock accordingly. A reset to zero may not be possible if the master clock and/or the slave clock are used for another purpose. Although not necessary, this initialization limits the offset between the master clock and the slave clock to a processing delay plus the air propagation delay associated with wireless packet communication. In the normal mode, no initialization is performed. The first message indicates to the slave device that the following sync arrival interrupt from the RF module must be time-stamped. The second message from the master device includes the master time stamp for the packet transmit interrupt. The third message from the master device includes the time stamp for the sync arrival interrupt in the master device. An optional fourth message may be required if the acquisition mode is implemented such that the time of the master clock needs to be sent to the slave device for the initialization.

At 550, the slave clock is synchronized to the master clock using the master time stamps and the slave time stamps. Once the third message from the master device is received, the slave device may start calculating the frequency and phase offsets between the master clock and the slave clock and processing these offsets. Trimming of the slave clock may be done in the next idle period between the reception and transmission slots of the slave device or, if time does not permit, in the following idle period. Both the frequency offset and the phase offset are tracked through the four time stamps. To dampen the effect of the jitter noise present in these time stamps, low-pass filtering may be performed on the offsets before they are used to adjust the slave clock. However, when only coarse trimming of the crystal or frequency reference is performed to adjust its frequency, simulations have shown that only minimal filtering is required. The reason is that a coarse trimmer favors rapid and more frequent adjustments for faster offset tracking. In one embodiment, the phase offset data is not filtered while the frequency offset data is filtered with a minimal amount of low-pass filtering. Because the frequency offset is the derivative of the phase offset, it is calculated by subtracting the phase offset at time t from the offset t−l, at wherein l is an integer number of packet transmission or reception times.

This completes the synchronization cycle. In one embodiment, the complete synchronization cycle has a maximum length of about 64 milliseconds, including crystal trimming or reference oscillator adjustment, and is repeated once a second (i.e., at a frequency of about 1 Hz). A 1-second period is found to be a good compromise between processing effort and residual clock phase error. The frequency of the master clock and the slave clock are about 1.536 MHz (which is derived from a system clock by dividing its frequency, 6.144 MHz, by 4). The master clock and the slave clock are each a 16-bit counter timer, giving a wrap-around period of about 42 milliseconds. Clock trimming may be triggered in two ways. Both the frequency offset and the phase offset are compared to their corresponding thresholds. If either the frequency offset or the phase offset is higher than its threshold, a single step adjustment is made to the slave clock for the synchronization cycle. A frequency error is given priority in the comparison to correct for any frequency offsets before attempting any phase offset correction. If the frequency offset is below its threshold for the synchronization cycle, a correction based on the phase offset is made if the latter is above its threshold. The corrections based on the frequency offset and the phase offset work together so that the relative frequency error does not become too large and form an unstable loop. However, during the acquisition mode when fast convergence is desired, the frequency threshold may be increased so that large phase offsets converge faster to a given bound before the frequency based adjustments are resumed. In one example, the relative frequency error is allowed to increase up to ±10 ppm until the phase offset is low enough at which point the frequency correction starts and drives the relative frequency error back to an average of 0 ppm during a steady state. Because of these drastic adjustments during the acquisition mode, no usable data is expected to be transmitted in the payload during the period of that mode. Simulations show that a 300 microsecond phase offset can be reduced to within ±15 microseconds in less than 40 seconds at a rate of one adjustment per second (i.e., the synchronization cycle initiated periodically at about 1 Hz). In a steady state operation, the two correction signals (the frequency and phase offsets) work together to achieve a phase error of less than ±15 microseconds.

Figure 6:
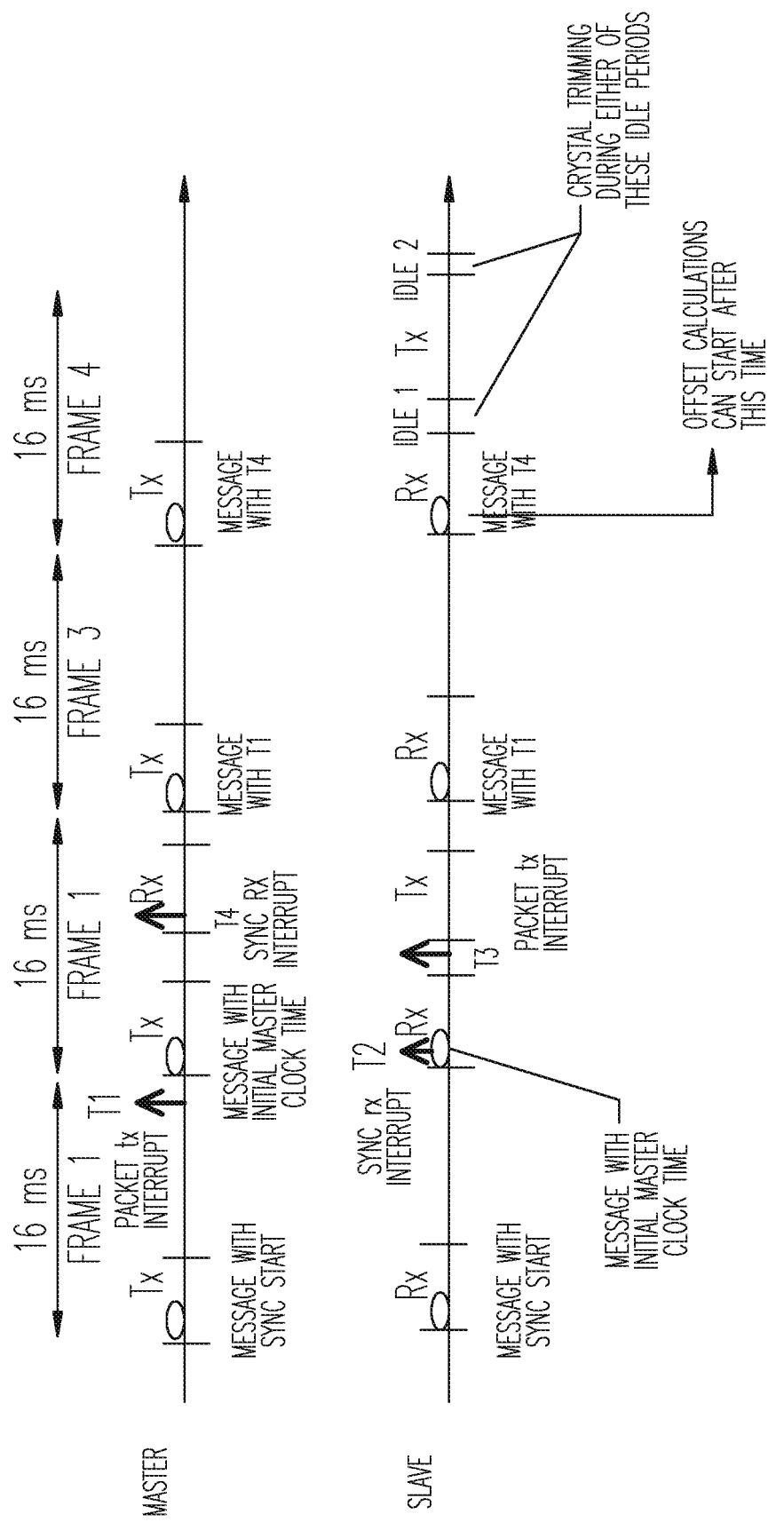
FIG. 6 is a timing diagram illustrating timing of various events associated with the method of FIG. 5.

FIG. 6 is a timing diagram illustrating timing of various events associated with method 500. The specific time values discussed below are for example only and based on a synchronization cycle that is repeated at a rate of once every second (i.e., at a frequency of about 1 Hz).

The master device prepares a new packet to be transmitted in frame 1. If it is the start of a synchronization cycle acquisition mode, at the packet transmit interrupt the master device either resets the master clock or copies the master clock time (timer count) to be sent to the slave device. In the header of the current packet, a "sync start" message is inserted. The transmission of the master clock time is delayed to the next frame. The sync start message indicates to the slave device that the arrival time of the subsequent packet must be time-stamped. If this is an acquisition mode message, it also triggers a reset of the slave clock, or if a master clock time is expected, the slave device makes a note of it until the next frame header where the master clock time is embedded. One or more of 22 bits of embedded message are carved out to indicate a time sync start (TSS). It is noted that TSS is to be differentiated from SS (sync_started, which refers to a receiver interrupt from the radio).

On the subsequent packet to be transmitted from the master device in frame 2, the master device time-stamps the packet transmit interrupt and saves its master clock time. Due to processing delays, the master device does not have time to insert this time stamp in the header of the current packet of frame 2, and it has to wait until the following packet in frame 3. The processing delay from transmission of the packet transmit interrupt to the packet getting on the air is assumed to be deterministic and symmetrical on both devices to within small timing jitters. The transmission of the packet transmit interrupt is time stamp T1. However, instead of T1, the master device inserts its initial master clock time from frame 1 in the current header.

In the slave device in frame 2, the sync arrival interrupt indicates the arrival of the packet. The slave device time-stamps this arrival using its receive packet interrupt. This is event is time stamped as T2. If this is an acquisition phase and an initialization master clock time is expected from the master device, the slave device extracts this value from the header and adjusts the slave clock.

Still in frame 2, the slave device uses its packet transmit interrupt to time-stamp its transmission event. This is time stamp T3, which is not transmitted out but saved locally in the slave device for future processing.

Also in frame 2, the master device receives the packet arrival interrupt via the sync started interrupt from the radio (SS) which has been set up via the interrupt source register on the radio. The master device time-stamps this event in the receive interrupt service routine. This is time stamp T4, which is the last time stamp needed for the synchronization cycle.

In frame 3, the master device inserts T1 in the packet header. The slave device receives this packet in frame 3 and extracts the time stamp in the header.

In frame 4, the master device inserts T4 in the packet header. The slave device receives this packet in frame 4 and extracts the time stamp in the header.

The slave device, within the next approximately 16 milliseconds, processes all four time stamps T1-T4 and calculates a correction factor. During the next idle period between transmission and reception, the slave device sends this value to the reference oscillator adjustment register to adjust for the system clock frequency offset. This can be done in Idle1 or Idle2. The process from sync start message to the reference oscillator adjustment takes about 4 frames, or about 64 milliseconds.

The four time stamps are analyzed more specifically as follows. The time difference between a transmission in the master device and the corresponding reception in the slave device may be written as: T2−T1=Clock Offset Deterministic Master Processing Delay+Master Device RF delay+Air Propagation Delay+Slave Device RF Jitter+Slave Device RF Sync start (SS) Interrupt Jitter+Slave Device ISR Deterministic Cycles+Slave Device ISR Latency+Slave Clock Read Jitter+Master Device Packet Interrupt Jitter+Master Device ISR Latency+Master Device ISR Deterministic Cycles+Master Clock Read Jitter. The time difference between a transmission in the slave device and the corresponding reception in the master device may be written as: T4−T3=−Clock Offset+Deterministic Slave Device Processing Delay+Save Device RF Delay+Air Propagation Delay+Master Device RF Jitter+Master Device RF Sync Start (SS) Interrupt Jitter+Master Device ISR Deterministic Cycles+Master Device ISR Latency+Master Clock Read Jitter+Slave Clock Read Jitter+Slave Packet Interrupt Jitter+Slave Device ISR Latency+Slave Device ISR Deterministic Cycles. If the processing in the master device and the processing in the slave device are symmetrical, then all the deterministic delays are identical. The propagation channel is also assumed identical between the two devices. For the purpose of this analysis, the ISR latencies are assumed to be non-existent or insignificant.

The offset of the slave clock relative to the master clock may be written as ((T2−T1)−(T4−T3))/2+Combined RF and Interrupt Jitters. The jitters are independent and uniformly distributed. The following is a list of the timing jitters present in a test system and included in a simulation model.

On the slave device side:
1. Transmit Packet interrupt (assuming this is sampled with the bit clock)=±1/(2*186182) or ±2.69 microseconds.
2. Transmit Packet Clock Reading Ambiguity=±1/(2*1536000) or ±0.325 microseconds.
3. SS RF Sampling=±1/(2*6*186182) or ±0.448 microseconds.
4. SS Interrupt Sampling=±1/(2*6144000)=±0.08 microseconds.

5. SS Clock Read Jitter=±1/(2*1536000) or ±0.325 microseconds.

On the master device side (identical to slave device side):
1. Transmit Packet Interrupt (assuming this is sampled with the bit clock)=±1/(2*186182) or ±2.69 microseconds.
2. Transmit Packet Clock Reading Ambiguity=±1/(2*1536000) or ±10.325 microseconds.
3. SS RF Sampling=±1/(2*6*186182) or ±0.448 microseconds.
4. SS Interrupt Sampling=±1/(2*6144000)=±0.08 microseconds.
5. SS Clock Read Jitter=±1/(2*1536000) or ±0.325 microseconds.

Parameters used in the simulation model are listed in Table 1.

TABLE 1

| Parameter | Value |
|---|---|
| System clock | 6144000 MHz |
| Timer clock (using a divider of 4) | 1536000 MHz |
| Correction interval | 1 second |
| Correction step change each interval | 3.2 ppm |
| Time constant for frequency loop | 0.4 |
| Time constant for phase loop | 0 |
| Frequency offset threshold (steady state) | 3 timer counts |
| Frequency offset threshold (acquisition) | 15 timer counts |
| Phase offset threshold | 6 timer counts |
| Phase threshold for steady state operation | 25 timer counts |

In various embodiments, the present subject matter as discussed in this document provides for phased planar array processing of two spatially diverse microphones. The present subject matter also allows synchronous processing of audio information between two hearing instruments, such as a pair of hearing aids, to enhance listener experience especially in noisy environments.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear, on the ear, or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing system, comprising:
a first hearing instrument including:
a master clock; and
a master synchronization circuit configured to generate master time stamps for specified master device events using the master clock; and
a second hearing instrument configured to wirelessly communicate with the first hearing instrument, the second hearing instrument including:
a slave clock; and
a slave synchronization circuit configured to receive the master time stamps from the first hearing instrument, to generate slave time stamps for specified slave device events using the slave clock, to determine an offset between the master clock and the slave clock using the master time stamps and the slave time stamps, to compare the determined offset to a threshold, and to adjust the slave clock for synchronizing the slave clock to the master clock in response to the determined offset exceeding the threshold.

2. The system of claim 1, wherein the first hearing instrument further comprises a first radio circuit configured to transmit the master time stamps to the second hearing instrument, the second hearing instrument further comprises a second radio circuit configured to receive the master time stamps, and the first radio circuit and the second radio circuit are configured to transmit audio signals between the first hearing instrument and the second hearing instrument.

3. The system of claim 2, wherein the first hearing instrument comprises a first hearing aid.

4. The system of claim 3, wherein the second hearing instrument comprises a second hearing aid.

5. The system of claim 1, wherein the master synchronization circuit is configured to generate the master time stamps each time-stamping an event associated with a transmission or reception of an interrupt by the master device, and the slave synchronization circuit is configured to generate the slave time stamps each time-stamping an event associated with a transmission or reception of an interrupt by the slave device.

6. The system of claim 1, wherein the slave synchronization circuit is configured to determine one or more offset parameters indicative of the offset, to compare the one or more offset parameters each to a corresponding offset threshold, and to adjust the slave clock for synchronizing the slave clock to the master clock using the one or more offset parameters in response to at least one offset parameter of the one or more offset parameters exceeding the corresponding offset threshold.

7. The system of claim 6, wherein the one or more offset parameters comprise a frequency offset.

8. The system of claim 6, wherein the one or more offset parameters comprise a phase offset.

9. The system of claim 6, wherein the slave synchronization circuit is configured to determine a frequency offset and a phase offset of the one or more offset parameters, to compare the frequency offset to a specified frequency offset threshold, to compare the phase offset to a specified phase offset threshold, to adjust the frequency of the slave clock in response to the frequency offset exceeding the specified frequency offset threshold, and to adjust the phase of the slave clock in response to the phase offset exceeding the specified phase offset threshold.

10. The system of claim 9, wherein the slave synchronization circuit comprises a low-pass filter configured to filter at least the frequency offset before comparing the frequency offset to the specified frequency offset threshold.

11. A method for communication between hearing instruments, comprising:

generating master time stamps for specified events in a first hearing instrument timed using a master clock of the first hearing instrument, the first hearing instrument configured to be a master device;

transmitting the master time stamps to a second hearing instrument via a wireless link, the second hearing instrument configured to be a slave device;

generating slave time stamps for specified events in the second hearing instrument using a slave clock of the second hearing instrument; and synchronizing the slave clock to the master clock, including:

determining an offset between the master clock and the slave clock using the master time stamps and the slave time stamps;

comparing the determined offset to a threshold; and adjusting the slave clock for synchronization to the master clock in response to the determined offset exceeding the threshold.

12. The method of claim 11, further comprising transmitting audio signals between the first hearing instrument and the second hearing instrument via the wireless link.

13. The method of claim 12, further comprising initiating a synchronization cycle using the first hearing instrument, and wherein generating the master time stamps comprises generating the master time stamps during the synchronization cycle, and generating the slave time stamps comprises generating the slave time stamps during the synchronization cycle.

14. The method of claim 13, wherein initiating the synchronization cycle comprises initiating the synchronization cycle periodically.

15. The method of claim 13, wherein initiating the synchronization cycle comprises initiating the synchronization cycle upon occurrence of a specified event.

16. The method of claim 11, wherein generating the master time stamps and generating the slave time stamps each comprise generating time stamps each time-stamping an event associated with a transmission or reception of an interrupt.

17. The method of claim 16, wherein generating the time stamps each time-stamping the event associated with the transmission of reception of the interrupt comprises generating time stamps each time-stamping an event associated with a transmission or reception of a software interrupt.

18. The method of claim 11, wherein determining the offset comprises determining one or more offset parameters indicative of the offset, comparing the determined offset to the threshold comprises comparing the one or more offset parameters each to a corresponding offset threshold, and adjusting the slave clock comprises adjusting the slave clock using the one or more offset parameters in response to at least one offset parameter of the one or more offset parameters exceeding the corresponding offset threshold.

19. The method of claim 18, wherein determining the one or more offset parameters comprises determining a frequency offset and a phase offset, comparing the one or more offset parameters each to a corresponding offset threshold comprises comparing the frequency offset to a specified frequency offset threshold and comparing the phase offset to a specified phase offset threshold, and adjusting the slave clock comprises adjusting the frequency of the slave clock in response to the frequency offset exceeding the specified frequency offset threshold and adjusting the phase of the slave clock in response to the phase offset exceeding the specified phase offset threshold.

20. The method of claim 19, wherein comparing the frequency offset to the specified frequency offset threshold further comprises filtering the frequency offset using a low-pass-filter before comparing the frequency offset to the specified frequency offset threshold.

* * * * *